Aug. 14, 1962
C. H. COWLEY
3,048,944
APPARATUS FOR PRODUCING MULTIPLE SHEET GLAZING UNITS
Original Filed Oct. 24, 1957
4 Sheets-Sheet 1
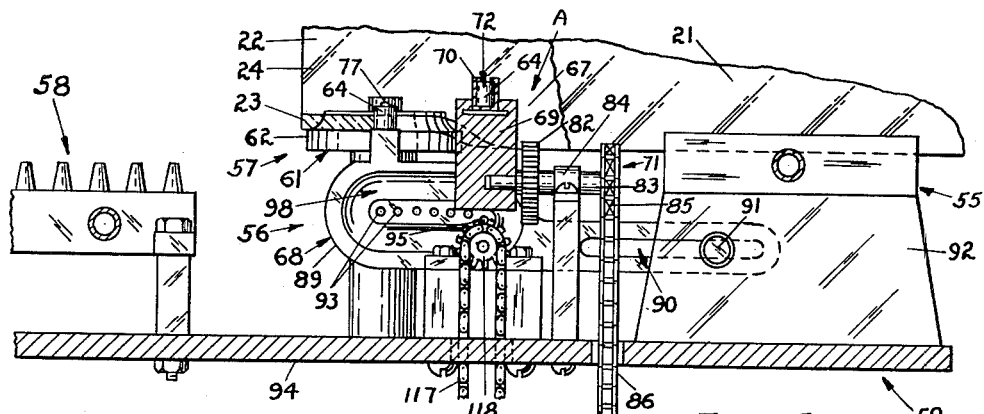
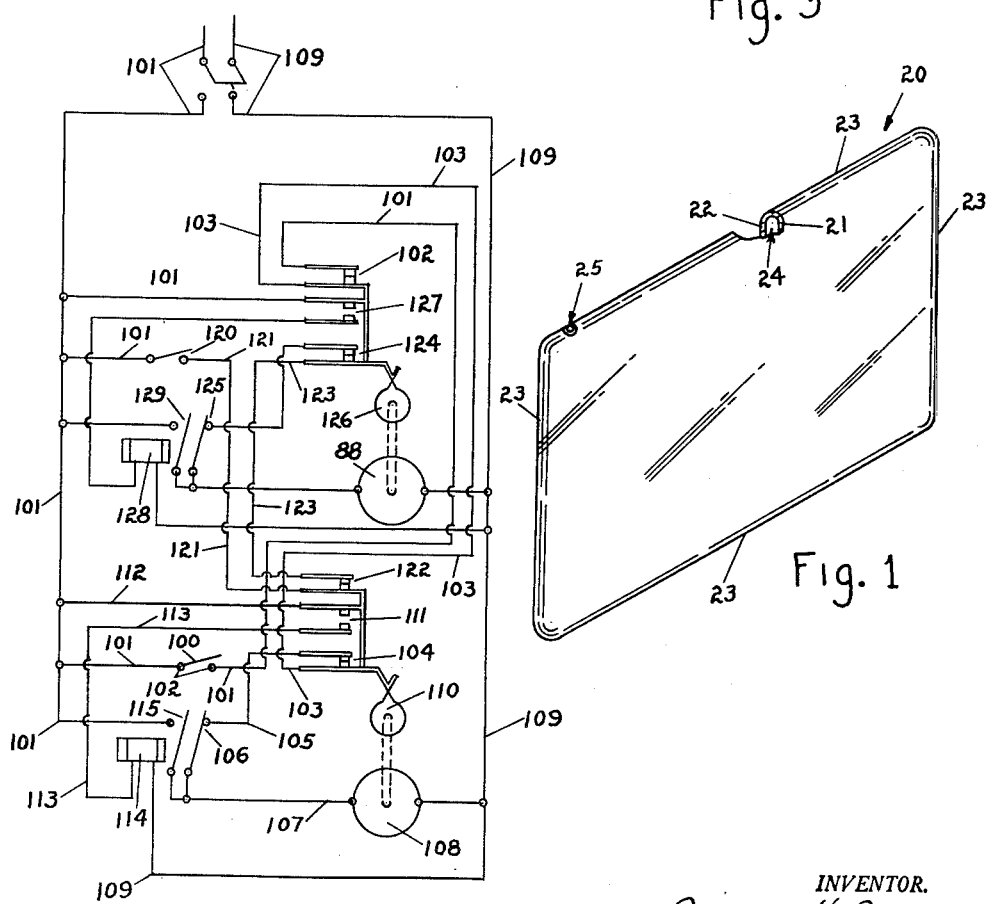
INVENTOR.
Charles H. Cowley
BY
Nobbe & Swope
ATTORNEYS Aug. 14, 1962

C. H. COWLEY 3,048,944

APPARATUS FOR PRODUCING MULTIPLE SHEET GLAZING UNITS

Original Filed Oct. 24, 1957

INVENTOR.
Charles H. Cowley
BY
Nobbe & Swope
ATTORNEYS

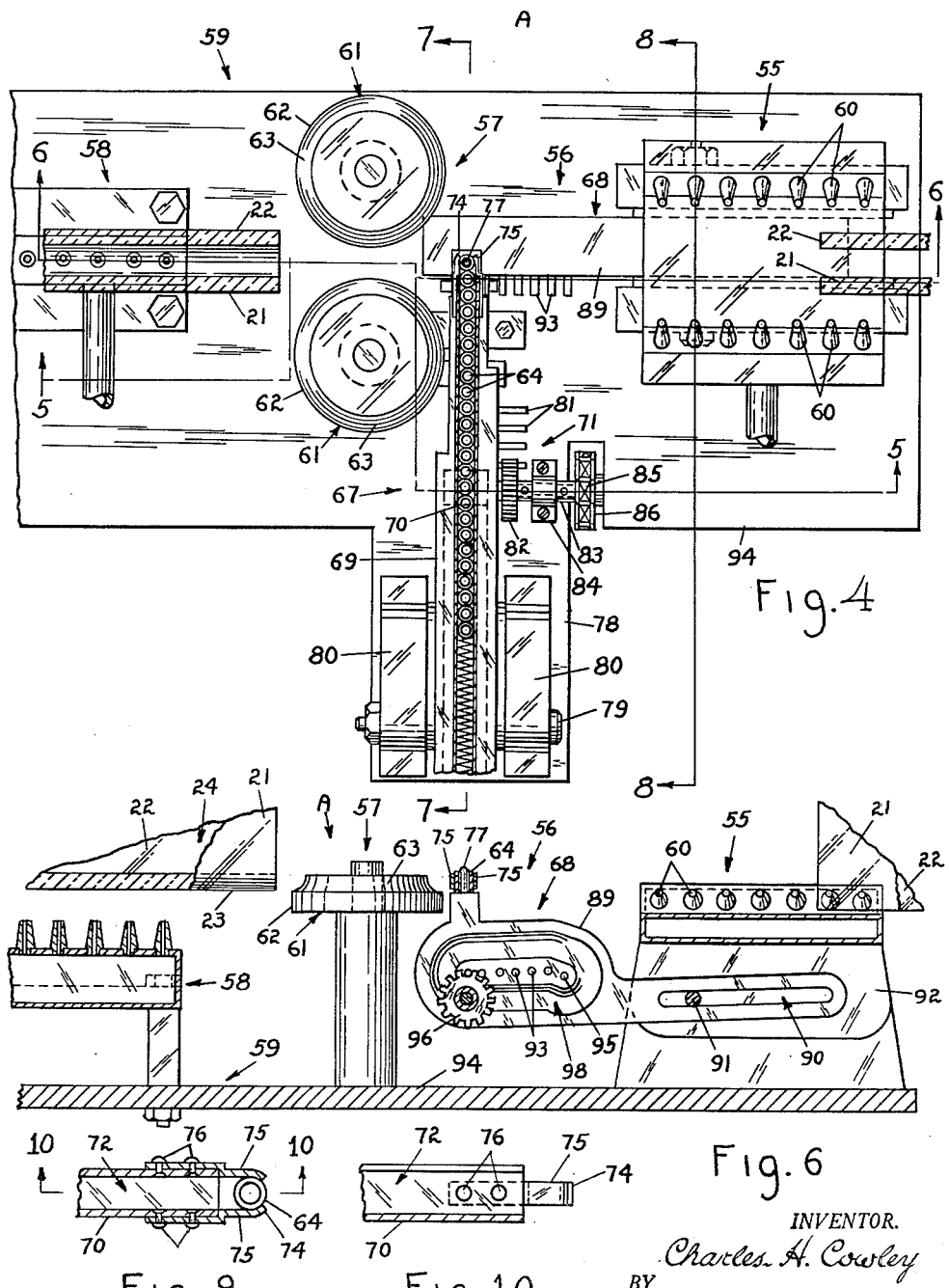

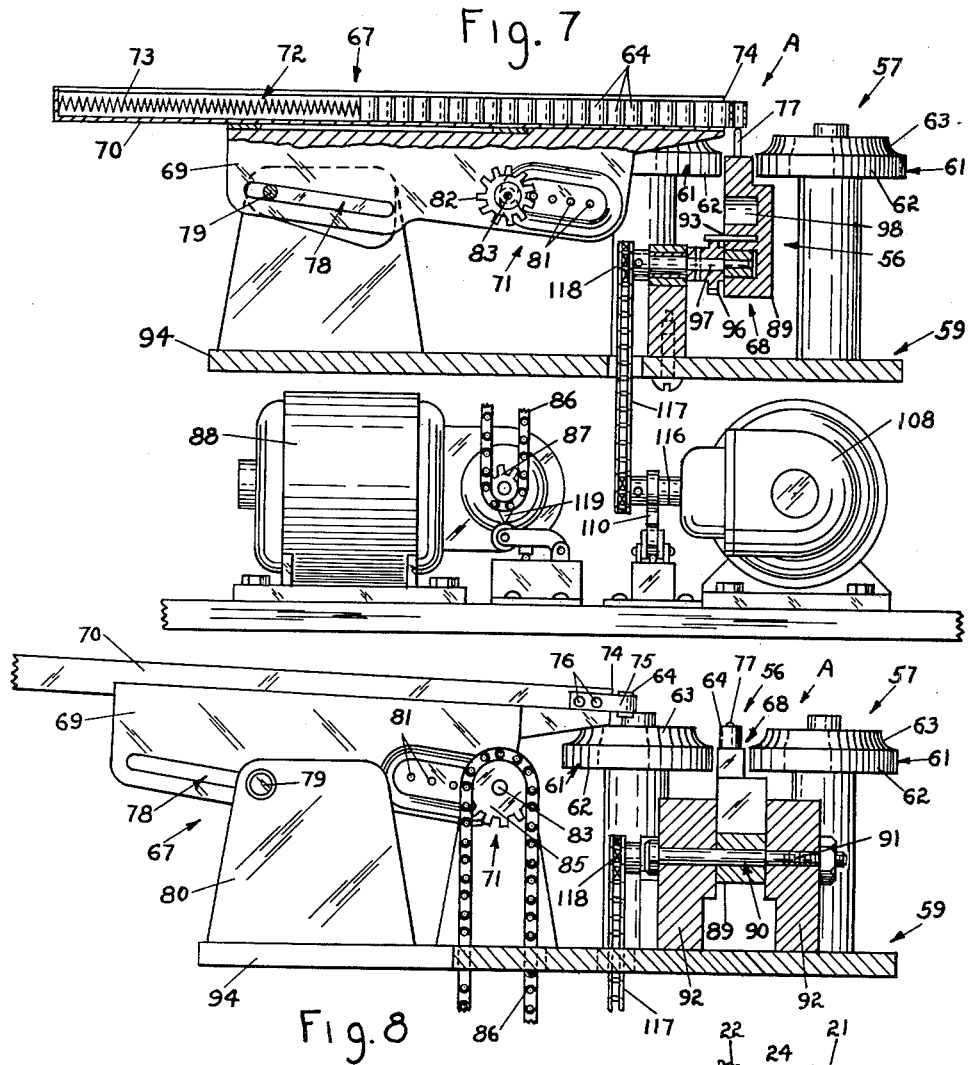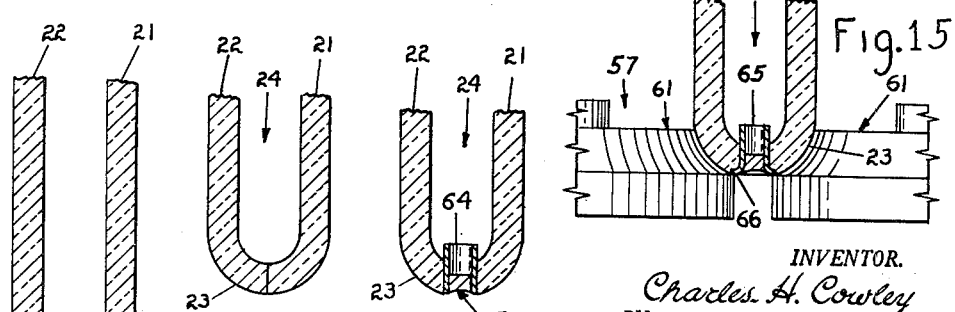

United States Patent Office 3,048,944
Patented Aug. 14, 1962

3,048,944
APPARATUS FOR PRODUCING MULTIPLE SHEET GLAZING UNITS
Charles H. Cowley, Toledo, Ohio, assignor to Libbey-Owens-Ford Glass Company, Toledo, Ohio, a corporation of Ohio
Original application Oct. 24, 1957, Ser. No. 692,181, now Patent No. 2,995,869, dated Aug. 15, 1961. Divided and this application Feb. 12, 1960, Ser. No. 13,976
11 Claims. (Cl. 49—1)

This invention relates broadly to all-glass multiple sheet glazing units and more particularly to an apparatus for providing an improved dehydration or breather hole in such multiple sheet glazing units.

This application is a division of application Serial No. 692,181, filed October 24, 1957, now Patent No. 2,995,869.

Multiple sheet glazing units generally comprise two or more sheets of glass which are sealed entirely around their edge portions in spaced relation to provide a hermetically sealed dead air space therebetween. Due principally to their insulating and condensation preventing qualities, such units are valuable in the building trades as windows for buildings, show cases, vehicles, refrigerators, and the like.

In order to provide a multiple sheet glazing unit with both heat insulating and condensation preventing qualities, it is necessary that humid or even air of normal moisture content be removed from the space between the sheets of glass making up the unit. This may be done by partial evacuation or by replacing the moisture containing air with dry air or gas which is best suited to the conditions to which the unit is to be exposed. To make possible the removal of air from the enclosed space between the glass sheets, with or without substituting dry air or gas therefor after the sheets have been joined at the marginal edges to enclose the space, a means of access to the space must be provided in the sealed unit. Likewise, after the space has been properly dehydrated the means of access must be permanently sealed to hermetically close the unit.

The conventional way of providing access to the enclosed space between the sheets of glazing units of this character, has been to drill or otherwise cut an opening through one of the sheets before they are sealed together. In this way the internal and external pressures may also be equalized while the edge portions of the sheets are being fused together. However, drilled holes of this type have several disadvantages in that the glass oftentimes breaks when drilled, or small fissures are produced around the hole in drilling which cause the sheet to break when exposed to thermal shock. Additionally, when the holes are drilled through the face surfaces of the glass sheets, the sealing material is, in many cases, exposed after the unit has been glazed leaving it vulnerable to sharp instruments such as a glazier's putty knife, etc.

It is a primary object of this invention to provide an all-glass multiple sheet glazing unit in which a dehydration hole or breather hole is provided along the sealed edge wall of the unit.

Another object of the invention is to provide an apparatus for forming dehydration holes or breather holes in the sealed edge portions of all-glass multiple sheet glazing units during the sealing of the sheets together.

A further object of the invention is to provide an apparatus for forming dehydration or breather holes in the sealed edge portions of all-glass multiple sheet glazing units while the sheets and the heat source for fusing them together are moving relative to one another.

Another object of the invention is to provide an apparatus for forming dehydration or breather holes in the sealed edge portions of all-glass multiple sheet glazing units by placing a hollow insert in the sealed edge portions while said portions are being fused.

Still another object of the invention is to provide an apparatus inserting a hollow metallic insert in the sealed edge portions of an all-glass multiple sheet glazing unit to provide an access hole to the enclosed space, the exposed end of the insert being substantially flush with the outer surface of the edge portions.

Another object of the invention is to provide a relatively simple inexpensive apparatus for forming such dehydration or breather holes in all-glass multiple sheet glazing units.

Other objects and advantages of the invention will become more apparent during the course of the following description when taken in connection with the accompanying drawings.

In the drawings, wherein like numerals are employed to designate like parts throughout the same:

FIG. 1 is a perspective view of an all-glass multiple sheet glazing unit provided with a dehydration hole according to the invention;

FIG. 4 is a fragmentary plan view of a forming tool and a hole forming means according to the invention;

FIG. 5 is a fragmentary sectional view taken along 5—5 of FIG. 4;

FIG. 6 is a sectional view taken along 6—6 of FIG. 4;

FIG. 7 is a sectional end elevational view taken along 7—7 of FIG. 4;

FIG. 8 is a sectional elevation view taken along 8—8 of FIG. 4;

FIG. 9 is a fragmentary plan view of a device for holding a novel dehydration hole insert in accordance with the invention;

FIG. 10 is a side elevational view partially in section taken along 10—10 of FIG. 9;

FIG. 11 is a sectional end view of the marginal edges of two sheets of glass;

FIG. 12 is a sectional end view of a sealed edge wall of an all-glass glazing unit;

FIG. 13 is a sectional view of an all-glass glazing unit showing a dehydration hole made in accordance with the invention;

FIG. 14 is an electrical control circuit for use in the invention; and

FIG. 15 is a sectional view of a modified form of insert being placed in the edge wall of a glazing unit according to the invention.

Figures 2, 3:
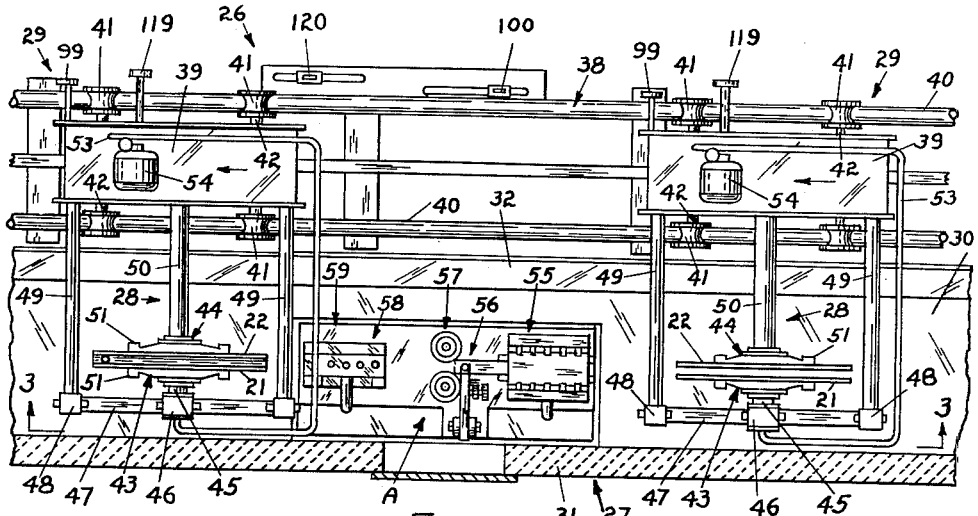
FIG. 2 is a plan view of the apparatus for producing glazing units showing a conveyor apparatus in relation to fusing burners and hole forming means.
FIG. 3 is a fragmentary sectional view of the apparatus for producing all-glass glazing units taken along 3—3 of FIG. 2.

Referring now to the drawings, there is shown in FIG. 1 an all-glass glazing unit 20 produced in accordance with the present invention which comprises two or more sheets of glass 21 and 22 maintained spaced from one another by a fused edge wall 23 enclosing a space 24 therebetween. The dehydration or breather holes with which this invention is concerned, are provided in at least one of the edge wall portions 23 as shown at 25.

Briefly, the invention contemplates inserting a hollow sleeve between the spaced marginal edge portions of a pair of glass sheets and fusing these edge portions together around the sleeve to provide a dehydration or breather hole in the sealed edge wall.

As can be seen best in FIGS. 2 and 3 a preferred apparatus for producing the improved all-glass multiple sheet glazing unit of this invention is designated generally by the number 26 and includes a tunnel type furnace 27, means 28 for supporting spaced glass sheets within the furnace, and a conveyor 29 mounted outside the furnace for moving the sheet supporting means through the furnace.

Turning now specifically to the furnace 27 (FIGS. 2 and 3) it is constructed of a lower wall 30, two side walls 31 and 32, and an overhead or ceiling wall 33 all made of firebrick or other suitable noninflammable material. The lower wall 30 is supported by longitudinally extending beams 34 which are supported by vertical members 35. For the purpose of illustration only heat is shown supplied to the furnace 27 by Nichrome or other wire filaments 36 fastened to the side walls 31 and 32. However, any one of a number of well known heating techniques may be used to produce the desired heating effect. Also in order to permit the moving of the sheet support means 28 within the furnace by the conveyor 29 outside the furnace, there is provided in the side wall 32 a slot extending longitudinally with respect to the furnace. Within the furnace there are a plurality of sealing areas, one of which is designated by the letter A through which the sheets 21 and 22 pass during the sealing process.

In being moved through the sealing areas, such as A, the sheet supporting means 28 and the sheets 21 and 22 are supported and carried by the conveyor 29 which includes generally a rail support frame 38 and a carriage 39 adapted to ride on rails 40 carried by the rail support frame.

Carriage 39 which is adapted to carry the sheets 21 and 22 through the furnace 27, includes a substantially rectangular base section provided with a plurality of grooved wheels 41 shaped to substantially the curvature of the rails 40 so as to guide the carriage as it moves the sheets through the furnace. Axles 42 for receiving wheels 41 are journaled in bearings (not shown) on the underside of the carriage base.

The glass sheet supporting means 28 comprises a pair of vacuum platens 43 and 44 to support the glass sheets 21 and 22 in a substantially vertical and spaced position with respect to one another as the sheets are moved through the furnace and the sealing section A. In particular, the vacuum platen 43 is maintained on one end of a stub shaft 45 which is rotatably mounted adjacent, and the other end is journaled in a bearing 46 on cross arm 47. Cross arm 47 is supported by means of pillow blocks 48 which are secured to conveyor 29 by means of shafts 49 secured thereto. Vacuum platen 44 is mounted on one end of a relatively long shaft 50 and is spaced from platen 43 a distance equal to the width of an all-glass multiple sheet glazing unit to be produced. The shaft 50 is rotatably journaled in a suitable bearing (not shown) and is turned by a handle (not shown) after each pair of edges of the sheets has been fused together in order to present an unsealed pair of edges in sealing position.

As illustrated in FIG. 3, each of the platens 43 and 44 is provided with vacuum cups 51 by means of which a partial vacuum can be applied to the glass sheets in order to hold them against the faces of the respective platens. Grooves 52 are provided along each of the faces of the platens in order to connect vacuum cups 51 to a central opening (not shown) provided in the stub shaft 45 and the longer shaft 50 with a pipe member 53 connected to a suitable vacuum pump 54.

Sealing station A comprises a fusing burner 55, a dehydration or breather hole making device 56, a forming, or shaping tool 57 and a polishing burner 58 all mounted on a frame support 59 extending into the furnace 27.

The fusing burner 55 comprises two rows of nozzles 60 mounted for directing flames onto the edge portions of the glass sheets as they are carried past by the conveyor 29 and in that manner to raise their temperature sufficiently high to produce a pliable condition therein.

After the marginal edge portions of the glass sheets 21 and 22 have been heated to a pliable condition by the flames from nozzles 60 the sheets are moved into contact with the forming tool 57 comprising a pair of horizontally mounted forming wheels 61 which are driven by the frictional engagement with the sheets. Preferably, see FIG. 5, each of these wheels 61 has a lower cylindrical portion 62 of a uniform circumference, while the upper portions are tapered to provide a concave portion 63. As a pair of softened glass edges move through the forming tool 57 they are deflected from the surface of the concave portion 63 inwardly to a point where the edges are fused together forming the edge wall 23.

While the edges of the glass sheets are being fused together by the forming tool 57, according to the invention the device 56 places a hollow insert 64 between the marginal edges about to be fused and holds this insert in place until the glass edges are formed about it sufficiently to hold it in a tight sealed relationship. A more complete discussion of the structure of the insert 64 and the operation of the insertion device 56 will be given below.

It was formerly common practice in the production of multiple sheet glazing units of the type disclosed herein to place dehydration or breather holes in the face portion of the glass sheets before the edges were sealed. This type of breather hole was found to be unsatisfactory in many instances because of breakage which occurred during drilling of the sheets or because of fissures emanating from the drilled holes which produced fractures when thermal shock took place. According to a preferred embodiment of the invention, to alleviate this condition the dehydration or breather holes 25 are formed in an edge wall 23 of a glazing unit as the edge wall is being formed. As given above, the dehydration hole according to the invention is produced by the insertion of a sleeve or insert 64 between the heated marginal edges of glass sheets 21 and 22 while they are being formed by the forming tool 57. When the glass edges have been formed around the insert 64, this hollow cavity produces the required access hole 25 to the space between the sheets.

A preferred form of insert 64 (FIG. 13) is that of a cylinder which when positioned in the sealed edge 23 of a glazing unit has its central opening extending from the space between the sheets to the exterior of the glazing unit so as to be disposed with its long dimension substantially parallel with the flat surfaces of the sheets and perpendicular to the sealed edge. By means of this access hole the interior of the glazing unit may be dehydrated or charged with an inert gas after which the insert is sealed off preferably by placing a drop of molten solder into its exterior opening. A modified form of insert 65 illustrated in FIG. 15 has a flanged portion 66 which, when the insert is properly placed in the edge wall 23 of glazing unit, is substantially flush with the outer edge wall surface. Of course there are any number of possible shapes of inserts which may be used, however, the two described above have been found to be the most satisfactory.

Although breather inserts may possibly be made from a number of different metals, alloys, or ceramic materials, the most satisfactory results were obtained with a cylindrical sleeve made from a nickel-cobalt-iron alloy.

Referring now to FIGS. 4 through 8 there are illustrated the details of a sealing station A incorporating the dehydration hole making device 56 in accordance with the present invention. This device comprises broadly an insert feed supply 67 and an insertion device 68. The function of the former is to provide a continuous supply of inserts in position for being placed in the edge of a glazing unit while the function of the latter is to insert the inserts in a properly timed relationship with the fusing of the sheet edges.

The insert feed supply 67 comprises a body portion 69, a storage tube 70 mounted on the body portion and in which a plurality of cylindrical grommets are maintained in a fixed closely abutting relationship therein, and a reciprocating motion means 71. As can be seen best in FIGS. 6 and 7 the storage tube 70 is a hollow elongated structure so adapted as to be able to receive a plurality of cylindrical inserts 64 disposed in a line in the central cavity 72 with the openings of the inserts substantially at right angles to the long dimension of the storage tube. A loaded spring 73 applies force to the line of inserts urging them away from the closed end of the storage tube and toward the open or loading end 74. A pair of spring clips 75 secured to the vertical sides of the storage tube by rivets 76 (FIG. 9) engage and hold the insert being forced outwardly of the open end 74 of the storage tube by the spring 73. This action of the spring and clips provides a continuous supply of these inserts in position for insertion. Thus, as shown in FIGS. 4 and 8 when this outer insert is pulled loose or removed the force of spring 73 will move the next insert in the line from the end of the storage tube 70 into the grip of the spring clips 75 and in loading position prior to insertion into the next glazing unit.

The storage tube 70 is fixedly secured to the body portion 69 which is so adapted as to be capable of being moved reciprocatingly toward and away from the path of the moving glass sheets so that an insert 64 may be placed on an insertion pin 77 and then the storage tube 70 and body portion 69 moved away to prevent interference with the glass sheets as they move through the sealing station (see especially FIGS. 4, 6 and 7). The body portion 69 is provided with a longitudinally extending slot 78 disposed at a slight angle to the storage tube 70 so that when the slot is received by gudgeon 79 fixedly secured to support base 80 the body portion also moves slightly downwardly on being moved toward the path of the glass sheets and slightly upwardly on being moved away from the path of the sheets. Adjacent the slot 78 there are provided a plurality of spaced pins 81 extending outwardly from the surface of the body and arranged in a line parallel to the slot. A spur gear 82 is provided to engage the pin 81 so that the desired reciprocating motion of the body portion 69 may be produced on rotation of the gear. Thus, as is shown in FIG. 7 turning the gear 82 in a clockwise direction will provide first a downward motion of the storage tube 70 for placing the grommet being held by the spring clips onto the insertion pin 77. Further rotation of the gear 82 will cause it to engage the other pins to produce a movement of the storage tube and supporting body portion away from the path of the glass sheets and upward until the gear is engaging the rightmost pin (FIGS. 6 or 7) at which time the body portion and storage tube are at the highest and farthest position away from the glass sheets. Further clockwise rotation of the gear 82 will move the storage tube and the body portion toward the path of the sheets until the position is reached with a grommet being held again just above the insertion pin 77 as illustrated in FIG. 6 or 7. The grommet is loaded onto the insertion finger 77 in a timed relationship with the fusing operation and will be described in that connecton hereinbelow.

The gear 82 is mounted on a shaft 83 suitably journaled in support 84 with the other end of the shaft receiving a gear 85 driven by chain 86 connected to driving gear 87 on the shaft of drive motor 88.

The grommet insertion device 68 comprises a body portion 89 mounted for reciprocating movement between a pair of sheets passing through the sealing station A and in a plane parallel to the sheets. This motion is such that the insertion pin or finger 77 fixedly secured to the upper surface of the body portion 89 is moved between the forming wheels 61 and maintained in an upright position substantially parallel to the forming wheel drive shafts and then moved downward and away from the shaping tool 57. In its more specific aspects as illustrated particularly in FIG. 5 the pin 77, after it has been loaded with an insert 64, is moved toward the forming rolls 61 in the same direction as the movement of the sheets and continues this movement until the pin reaches a point approximately on a line between the centers of the forming wheels 61. At this point the insert is also completely embedded in and secured by the pliable edges of the glass sheets which have been formed by the tool 57 and while still at this point a slight upward movement is provided to the pin in order to insure that the insert is fully seated in the edge wall 23. After this upward push the pin projection 77 is then carried downward or away from the sealed edge wall 23 leaving the insert sealed in place.

Examining the insertion device 68 in greater detail it will be noted that the body portion 89 contains a longitudinal slot 90 for receiving a pivot pin 91 mounted on side supporting walls 92 of the fusing burner 55 substantially horizontally and transverse to the path of movement of the sheets. Adjacent the slot 90 on the body portion 89 there are provided a series of pinlike projections 93 arranged in a substantially horizontal line and projecting outwardly from the body portion substantially parallel to the base support 94. At the end of the horizontal line of projections an additional projection 95 is placed lower than the other projections the purpose of which will be given later. A gear 96 is mounted so that it may engage the pin projections 93 and 95 and its shaft 97 will extend beyond the gear hub to ride in a channel 98 provided in the body portion 89 which completely surrounds the projections. Rotating the gear 96, initially positioned as shown in FIG. 6, in a counterclockwise direction moves the body portion 89 and the insertion pin 77 carried thereby between the rollers 61. When the gear 96 engages the lower pin 95 it provides the body portion and pin 77 with the slight upward motion for sealing the grommet as described above. As the gear passes around pin 95 and begins to move along the upper part of the channel 98 the insertion pin is then dropped down to a lower position and further movement of the gear 96 moves insertion pin 77 toward the fusing burners and away from the forming tool 57.

It is necessary that the insertion of an insert into a sealed edge of a glazing unit as described above be done in a timed relation with the loading of the insertion pin and with the sealing of the glass edges in order to prevent mutual interference of these different operations. Thus, as an example, if the insert loading device 67 is left in its loading position it will obstruct the passage of the glass sheets between the forming rolls 61. Accordingly, to obviate interference of this sort a properly sequenced relationship of the various operations involved is provided by an interlocking electrical network the diagram of which is given in FIG. 14. Assuming that an insert has been placed on the insertion pin 77 and the conveyor 29 carrying a pair of glass sheets to be sealed is moving along its path, the insertion operation is initiated by cam 99 (FIG. 2) actuating switch 100 mounted adjacent the conveyor rails 40. Closing switch 100 provides a circuit from one side of the power line 101, switch 100 (closed) points 102, wire 103, point 104, wire 105, relay points 106 (closed), wire 107, and motor 108, the other side of the motor being connected directly to the other side of the powerline 109. Rotation of motor 108 turns cam 110 which closes switch points 111 to provide a circuit from line 101, wire 112, switch points 111 (now closed), wire 113 and energizes relay 114 the other side of which is connected directly to line 109. The energizing of relay 114 closes relay points 115 to provide a circuit from line 101 through relay points 115 (now closed), wire 107 and motor 108 to keep it running.

As is shown in FIG. 7, motor 108 provides power through shaft 116, chain 117, sprocket 118 (FIG. 8) mounted on shaft 97 to turn gear 96 in a counterclockwise direction as viewed in FIG. 5 in order to move the insert along the path described hereinabove and insert it between the sheet edges. Gear 96 is provided with an appropriate number of teeth so that one revolution of the gear will cause it to completely traverse the channel 98 which moves the insertion pin 77 from a position as shown in FIG. 5 up between the forming wheels 61 then downwardly and toward the fusing burner and once again returned to the position in FIG. 5. Also when motor 108 has made a complete revolution cam 110 restores points 104 to a normally closed position and points 111 to a normally open position. Opening of points 111 drops the circuit energizing relay 114 which opens up relay points 115 and the circuit to motor 108. Further, since the sheet carriage has passed farther along the path of movement, cam 99 has released switch 100 so that the motor 108 cannot be energized as it was initially.

At this point the pair of glass sheets are partially fused and an insert has been inserted in the edge wall. When the conveyor 29 has progressed to a point where the glass sheets are leaving the sealing station, cam 119 (FIG. 2), actuates switch 120 which initiates the procedure for loading another insert onto insertion projection 77. At the beginning of the loading procedure the "at rest" position of the loading device is that shown in FIG. 7 and is maintained throughout the sealing and insertion operations.

Closing of switch 120 provides a circuit from line 101, switch 120 (closed), wire 121, points 122 (closed), wire 123, point 124, relay point 125 (closed) to one side of motor 88 with the other side of the motor connected directly to the opposite line 109. Energizing motor 88 turns cam 126 which closes switch points 127 to provide a circuit from line 101, points 127 (now closed) to energize relay 128 the other side of which is connected directly to line 109. Energizing relay 128 closes relay points 129 to provide a holding circuit from line 101 to motor 88 since the circuit through switch 120 is of short duration due to the momentary actuation of the switch by the cam 119.

Motor 88 will continue rotating until it has completed one revolution at which time cam 126 will return to the "at rest" position opening points 127 deenergizing relay 128 which opens points 129 and drops the circuit to motor 88. As in the insertion procedure, one revolution of the driving motor 88 provides a complete cycling of the grommet loading from a position as shown in FIG. 7 to loading an insert on insertion pin 77 and returning the loading device 67 to a position as shown in FIG. 7. At this point the insertion pin is again loaded with an insert and is awaiting another pair of glass sheets for insertion as described above.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:
1. Apparatus for producing multiple sheet glazing units, comprising means for supporting sheets of glass in spaced face-to-face relation with respect to one another, heating means for raising the temperature of the marginal edge portions of said sheets to substantially the fusion point of the glass, conveyor means for effecting relative movement between said heating means and said glass sheets, forming means for urging the heated edge portions of said sheets into fusion contact with one another to form a sealed edge wall, and insertion means for disposing a hollow insert in the edge wall of said unit, said insertion means including a body portion, a projection carried by said body portion for receiving an insert, a loading means for bringing said insert into operative engagement with said projection, and reciprocatory moving means for moving said body portion so as to dispose said insert between the heated edge portions of said spaced sheets and then move said body portion away from the fused edge wall after the insert is in said edge wall.

2. Apparatus for producing multiple sheet glazing units as defined in claim 1, in which said loading means comprises a storage tube containing a plurality of inserts, means for urging the inserts through an opening in the tube, retaining fingers mounted on said storage tube adjacent said opening for receiving an insert from said opening and holding it in a fixed position, and reciprocating motion means adapted to move said storage tube and retaining fingers into position for loading an insert on the projection of said insertion means and then away from said insertion means after loading.

3. Apparatus for producing multiple sheet glazing units as defined in claim 1, in which sequencing means are provided for controlling the reciprocating movements of the loading means and the insertion means to obtain a predetermined sequence.

4. An apparatus for producing all-glass multiple sheet glazing units, which comprises means for supporting two sheets of glass in spaced face-to-face relation in a vertical position, heating means for raising the temperature of the edge portions of the glass sheets to the fusion temperature of the glass, means for effecting relative movement between the sheet supporting means and the heating means, means for positioning a hollow insert between the heated edge portions of said sheets during forward movement thereof, and means for progressively urging the heated edge portions of the sheets during such movement into fusion contact with one another to form a sealed edge wall and to simultaneously seal said hollow insert in said edge wall.

5. An apparatus for producing all-glass multiple sheet glazing units as claimed in claim 4, including means for moving said insert positioning means and hollow insert with the glass sheets during sealing of said insert in the edge wall of the unit and for subsequently disengaging said positioning means from said insert and returning it to a position to receive another insert.

6. An apparatus for producing all-glass multiple sheet glazing units as claimed in claim 4, in which said insert positioning means includes a vertical support element for receiving a hollow insert thereon and for holding the same substantially parallel between the heated edge portions of the glass sheets during the fusing thereof to form a sealed edge wall and in which means is provided for moving said support element with the glass sheets as the insert is being sealed into said edge wall.

7. An apparatus for producing all-glass multiple sheet glazing units as claimed in claim 6, including means for removing the support element away from the fused edge wall after the hollow insert has been sealed therein.

8. An apparatus for producing all-glass multiple sheet glazing units as claimed in claim 6, in which loading means are provided for bringing a hollow insert into operative engagement with said support element, said loading means comprising a storage tube containing a plurality of hollow inserts and having an opening at one end thereof, means for urging the inserts through the opening of the tube, retaining fingers carried at the end of the tube adjacent said opening for receiving an insert from said opening and holding it in fixed position, and means for moving the storage tube and retaining fingers into position to load an insert on the support element of the positioning means and away from said positioning means after loading.

9. An apparatus for producing all-glass multiple sheet glazing units as claimed in claim 8, in which the insert positioning means and the insert loading means are connected in an electric circuit actuated by the sheet supporting means for causing said positioning means and said loading means to operate in timed relation to one another.

10. An apparatus for producing all-glass multiple sheet glazing units as claimed in claim 9, in which said electrical circuit includes a switch, and in which actuating means is carried by the sheet supporting means for actuating the switch to cause the positioning means to position the hollow insert between the heated edge portions of the sheets.

11. An apparatus for producing all-glass multiple sheet glazing units as claimed in claim 10, in which said electrical circuit includes a second switch, and in which a second actuating means is carried by the sheet supporting means for actuating said second switch to cause the insert positioning means to return to a position to receive another hollow insert.

References Cited in the file of this patent

UNITED STATES PATENTS

| | | |
|---|---|---|
| 1,448,351 | Kirlin | Mar. 13, 1923 |
| 2,688,824 | Badger et al. | Sept. 14, 1954 |
| 2,761,249 | Olson et al. | Sept. 4, 1956 |